United States Patent [19]
Brown et al.

[11] Patent Number: 5,381,519
[45] Date of Patent: Jan. 10, 1995

[54] SYSTEM FOR LINE INTERPOLATION FOR COMPUTER GRAPHICS DISPLAYS

[75] Inventors: Russell A. Brown; Gary S. Watkins, both of Salt Lake City, Utah

[73] Assignee: Evans & Sutherland Computer Corp., Salt Lake City, Utah

[21] Appl. No.: 895,613

[22] Filed: Jun. 9, 1992

Related U.S. Application Data

[63] Continuation-in-part of Ser. No. 758,992, Sep. 10, 1991, abandoned, which is a continuation-in-part of Ser. No. 506,749, Apr. 10, 1990, abandoned, which is a continuation-in-part of Ser. No. 129,036, Dec. 4, 1987, abandoned.

[51] Int. Cl.$^6$ ............................................. G06F 15/00
[52] U.S. Cl. .................................................... 395/132
[58] Field of Search ............... 395/141, 142, 143, 132, 395/131, 130, 129, 117, 118

[56] References Cited

U.S. PATENT DOCUMENTS 5,341,460  8/1994  Tam ..................................... 395/119

*Primary Examiner*—Phu K. Nguyen
*Attorney, Agent, or Firm*—Nilsson, Wurst & Green

[57] ABSTRACT

Primitive data in the form of defined lines for a computer graphics display is processed as by interpolating triangles, as during scan conversion, and by treating lines as triangle edges. An offset point is selected, e.g. offset perpendicularly from the line midpoint a distance of one-half the line length to define a triangle vertex along with the line endpoints. The resulting triangle is interpolated for example as with barycentric coordinates. Accordingly, the line may be interpolated, e.g. shaded, as though it were an edge of the defined triangle. For lines, sample points are coerced to lie on the triangle edge.

14 Claims, 4 Drawing Sheets

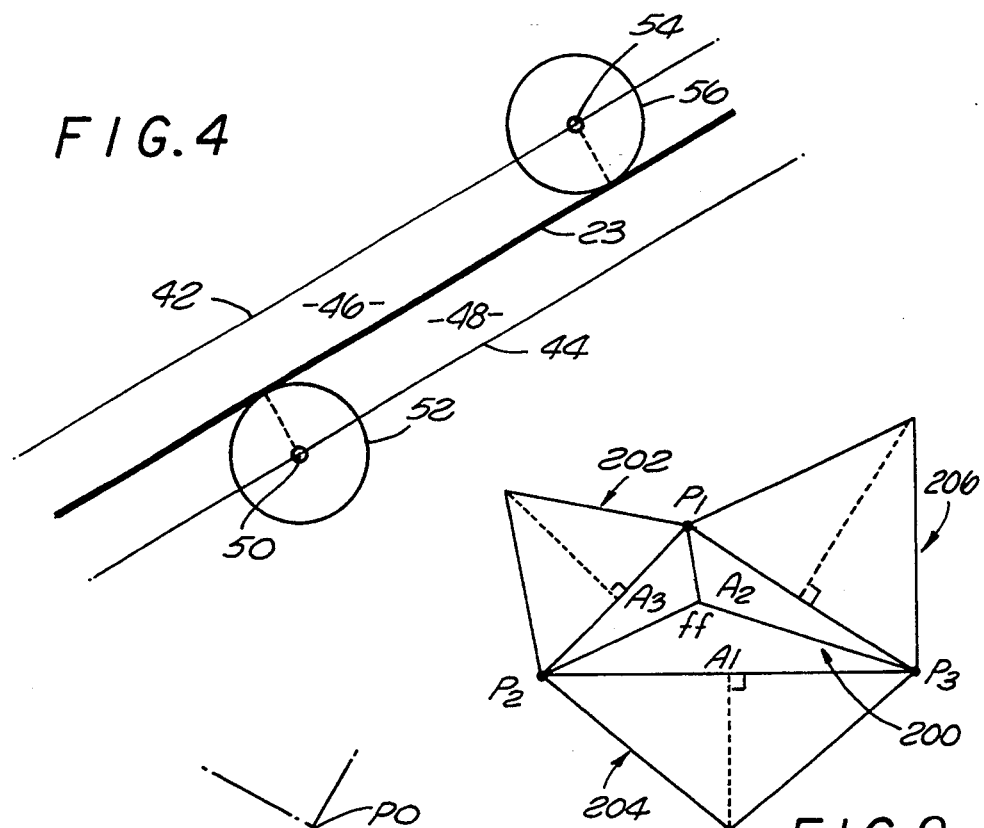
FIG.4
FIG.8
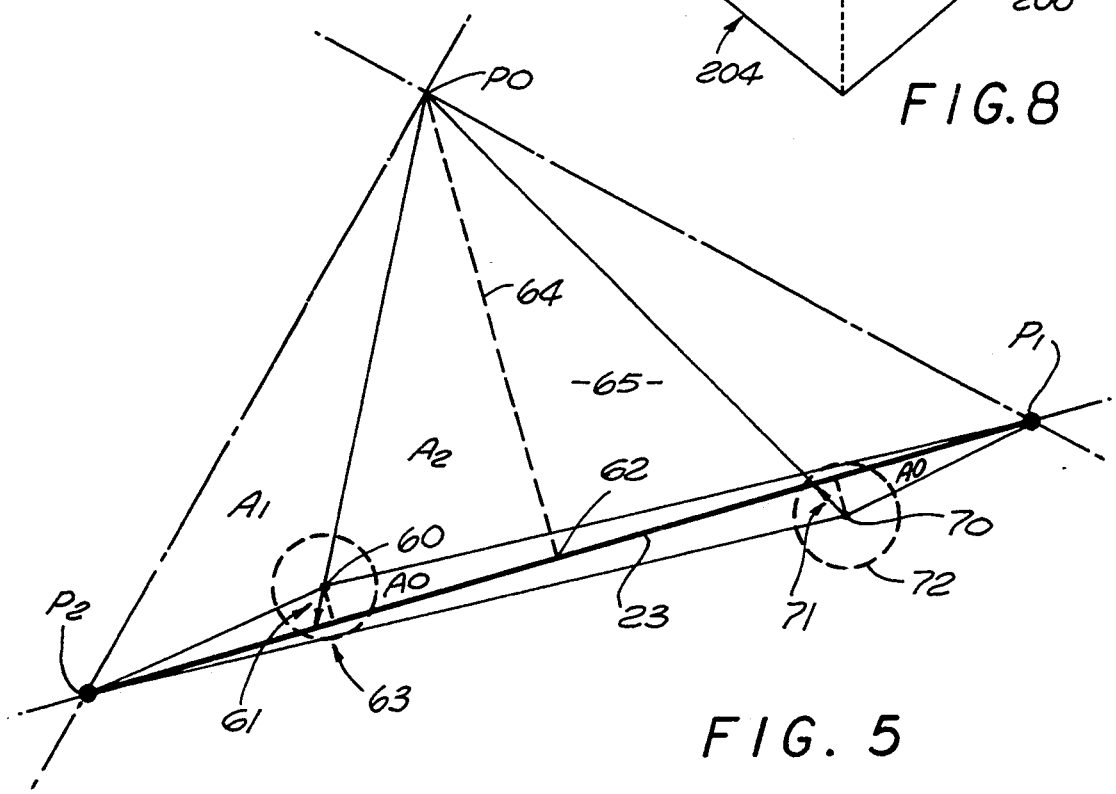
FIG. 5

SYSTEM FOR LINE INTERPOLATION FOR COMPUTER GRAPHICS DISPLAYS

RELATED SUBJECT MATTER

This application is a continuation-in-part of Application Ser. No. 07/758,992, filed Sep. 10, 1991, entitled "SYSTEM FOR POLYGON INTERPOLATION USING INSTANTANEOUS VALUES IN A VARIABLE," now abandoned which is a continuation-in-part of Application Ser. No. 07/506,749, filed Apr. 10, 1990, entitled "SYSTEM FOR USING BARYCENTRIC COORDINATES AS FOR POLYGON INTERPOLATION," now abandoned, which is a continuation-in-part of Application Ser. No. 07/129,036, filed Dec. 4, 1987, entitled "SYSTEM FOR USING BARYCENTRIC COORDINATES AS FOR POLYGON INTERPOLATION," now abandoned The benefit of the earlier filing dates in the United States is claimed under 35 U.S.C. S 120.

BACKGROUND AND SUMMARY OF THE INVENTION

At present, perhaps video games are the most commonly known form of computer graphics apparatus. However, the field embraces many other systems as for use in training, design, entertainment, modeling and so on. Typically, the systems give the viewer the impression of looking through a window at a picture somewhat like that of a television receiver. To generate the picture, the computer graphics system selects content from basic forms (primitives), orients the selected forms with respect to a window, accounts for hidden surfaces then displays a composed image on a viewing screen.

According to one technique, picture content is developed from primitives as polygons, e.g. triangles and lines. The polygons define outlines or solid areas of gray or color and are joined along with lines to form an object or a part of an object in the desired display. Typically, the polygons and lines are mathematically defined in three-dimensional, world space. Basic practice then involves orienting polygons and lines with respect to a viewpoint, scanning the primitives to define data for small, individual picture elements (pixels). Hidden-surface representations are selectively calculated, then the pixel representations are displayed, typically in a raster pattern to provide an image on a two-dimensional screen.

Essentially, the scan conversion of a polygon or line involves finding all the pixels that lie within the influence of such representations then setting the color and intensity contribution for each such pixel. In a typical display, a million pixels may be employed to compose a picture.

In accordance with conventional computer graphics techniques, a picture image is stored as a pattern of binary, digital numbers that represent individual pixels in a rectangular array. The numerical data representations of individual pixels are supplied in sequence to a cathode ray tube apparatus as the tube screen is scanned in a raster pattern to display the pixels sequentially in the rectangular array. Accordingly, the pixels are presented in a raster pattern as a succession of scan lines, each of which consists of a row of pixels. The raster scan is most familiar in the television displays.

Of course, objects of display in a computer graphics image seldom have the convenient shape of a geometric primitive. However, objects are decomposed into planar polygons and may be decomposed into triangular polygons for processing in accordance with well known techniques utilizing apparatus of the prior art. For some displays, lines also are used in the simulation of objects. While the technique of defining triangular polygons and lines to compose a picture is effective, the basic display appears unrealistic. For one thing, it is desirable for images to be smoothly shaded as by shading the representative polygons and lines. The technique of shading polygons is well known and is illustrated and described in a book entitled, *Principles of Interactive Computer Graphics*, Second Edition, Newman and Sproull, McGraw-Hill Book Company, 1979.

Various specific shading techniques are well known and used in the prior art; and in that regard, the referenced book describes both Gouraud and Phong shading techniques. Essentially, shading involves defining intensities at reference locations of a polygon and interpolating to shade the spaces in between. Similar techniques may be employed to impart texture to objects. Specifically, texturing techniques are described in the above-referenced book, *Principles of Interactive Computer Graphics*, referenced above, in a section beginning on page 407.

In the processing of primitives or polygons, space is defined in different coordinate systems in relation to reference points. Traditionally, polygons have been interpolated in screen space; however, such interpolation has been recognized as erroneous and deters from the quality of a displayed image. In that regard, a patent application, Ser. No. 07/758,992, "System for Polygon Interpolation Using Instantaneous Values in a Variable" is based on the recognition that considerably improved displays can be accomplished by interpolation in a space that is not subject to nonlinear distortion, e.g. world space. Accordingly, computer graphics images can be significantly improved.

Generally, in accordance with the present invention, it has been discovered that techniques used for the interpolation of polygons, e.g. triangles, also can be effectively adapted for the interpolation of lines. Specifically, in accordance with the present invention, a system has been developed for effectively shading lines as well as polygons as reflected in data for computer graphics images. The discovery involves adapting triangle interpolation techniques to lines thereby affording an effective sub-system for interpolating both triangles and lines. Generally, for interpolation, lines are treated as a triangle edge accommodating shading or other interpolations as by techniques utilizing barycentric coordinates.

The system of the present invention may be implemented conveniently in a graphics system incorporating techniques for barycentric interpolation as described in the referenced patent application. However, in any event, the system of the present invention may be implemented by a process of constructing a triangle from the endpoints of a line. One method is to move perpendicular to the line a distance of one-half the line length beginning at the midpoint of the line. Note that the factor of one-half is somewhat arbitrary; however, it does result in an isosceles triangle with an effective aspect ratio for the interpolation.

Utilizing the constructed triangle, the line is treated as an edge to accomplish interpolation, and accordingly to shade the line. In that regard, sample points for pixels that are contiguous to the line (triangle edge) receive a contribution from the line. Sample points may be coerced to the line to attain a contribution. Also, the edges of a triangle are treated as lines if the pixel in process falls outside the edge.

BRIEF DESCRIPTION OF THE DRAWINGS

In the drawings, which constitute a part of this specification, exemplary embodiments exhibiting various objectives and features hereof are set forth, specifically:

FIG. 4 is a graphic representation illustrating pixel sample points with respect to a line for display;

FIG. 5 is a graphic representation illustrating the construction of a triangle for construction to shade a line;

FIG. 8 is a graphic representation illustrating the construction of three isosceles triangles on a triangle being interpolated in accordance with the present invention.

DESCRIPTION OF THE ILLUSTRATIVE EMBODIMENT

A detailed illustrative embodiment of the present invention is disclosed herein; however, it is merely representative, recognizing that a wide variety of specific embodiments of the disclosed system are possible. Nevertheless, the illustrative embodiment is deemed to afford the best embodiment for purposes of disclosure and to provide a basis for the claims herein which define the scope of the present invention.

Figure 1:
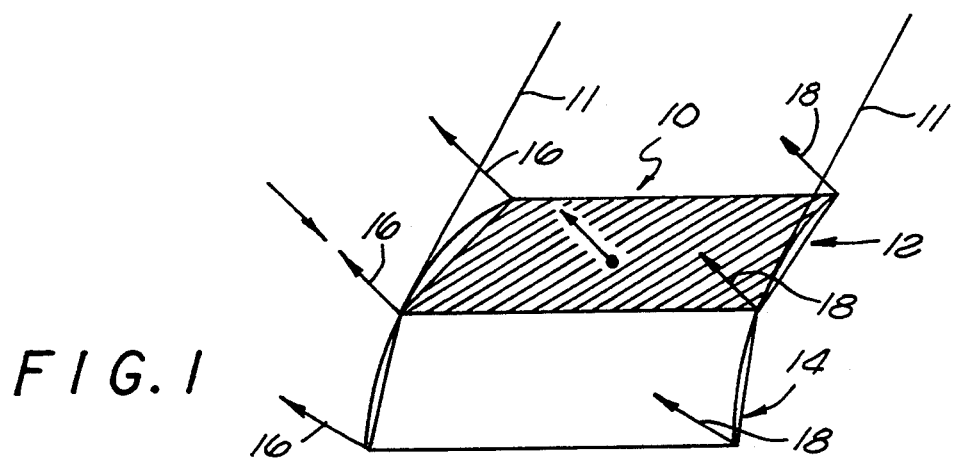
FIG. 1 is a graphic representation of a curved surface and lines illustrated with respect to decomposition and vertex normalization for shading in accordance herewith.

Initially, consideration of some graphic representations will be helpful as related to the present development. Therefore, consideration is provided with regard to the decomposition of primitives into planar polygons, e.g. triangles, for effective use in the development of image data. Specifically, referring to FIG. 1, a curved surface is represented comprising a fragment 10 of a cylinder (viewed from inside) along with extension lines 11. The cylindrical fragment 10 is crudely simulated by a pair of plane rectangular polygons 12 and 14. As well known, the rectangular polygons can be converted to triangles for processing.

To more closely simulate the shading of the cylindrical fragment 10, an increased number of planar polygons could be used. However, for purposes of the present explanation, it can be seen that the two planar polygons 12 and 14 roughly simulate the cylindrical surface. Accordingly, some approximation is accomplished, and the relatively large polygons 12 and 14 are convenient and useful for the following explanation.

Note that each of the polygons 12 and 14 is shown with a uniform intensity or shade to approximate the shading for the curved fragment 10. With frontal illumination of the external surface, as illustrated, the polygon 12 is shaded darker than the polygon 14. Techniques for such shading are described in Chapter 25 of the above-referenced book, *Principles of Interactive Computer Graphics.*

While uniformly shading individual polygons that define an object imparts some realism, such displays tend to have a patchwork appearance. For greater realism, it has been proposed to smoothly shade the polygons utilizing interpolative techniques. Such techniques are treated in the above-referenced book at Chapter 25 and may involve interpolation from normals located at the vertices of each polygon. Note that the surface normal vectors at the vertices of the polygons 12 and 14 are generally indicated by arrows 16 and 18. Also, the surface of the cylindrical fragment 10 coincides to the polygons 12 and 14 at the polygon vertices. Accordingly, polygons can be interpolated for non-uniform shading or texturing. In that regard, rectangular polygons may be dissected into triangles. In addition, in accordance herewith, triangle interpolation techniques may be employed in interpolating the lines 11. Next, consider the dissection of primitives as lines and triangles.

Figure 2:
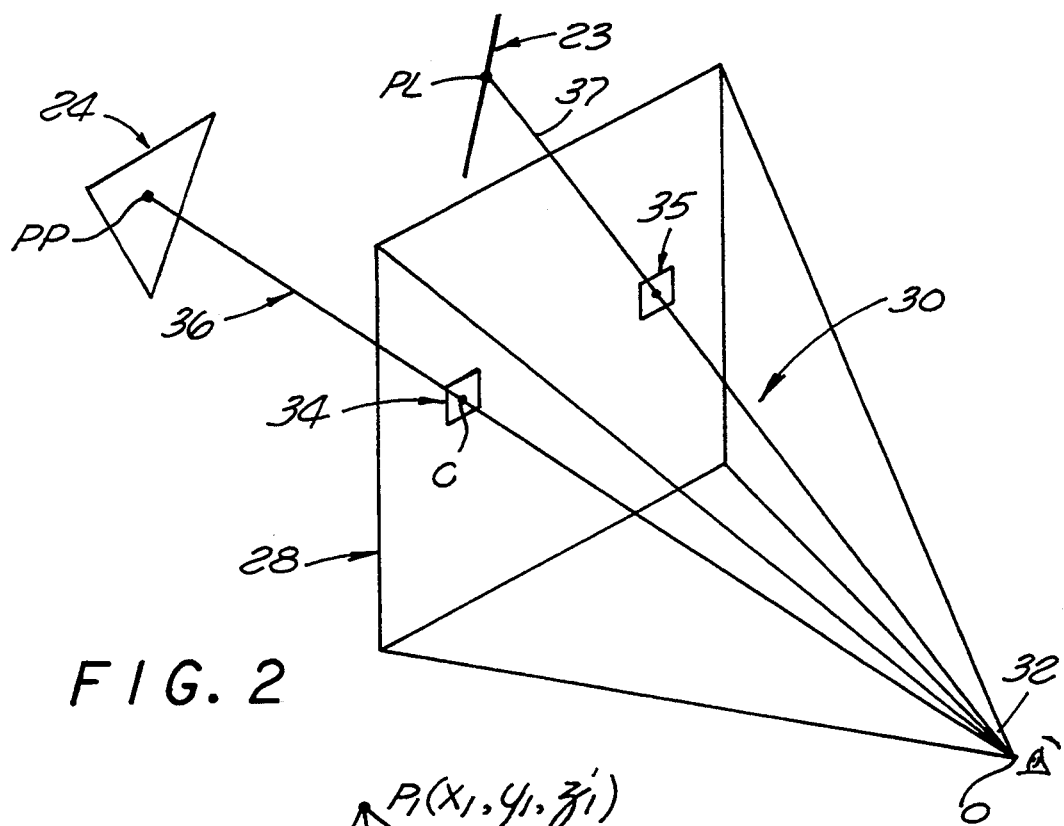
FIG. 2 is a graphic representation illustrating a view frustum radiating from an eyepoint with respect to screen space and world space as treated herein.

FIG. 2 shows a line 23 and a triangle 24, both of which will be considered with respect to interpolation as to accomplish non-uniform shading. Initially, consider the triangle 24 as illustrated in world space.

In accordance with traditional techniques, the vertices of the triangle 24 are referenced to a point of origin (not shown) in world space. The world space origin also is established with reference to an eyepoint O (FIG. 2, lower right) in terms of eye space. Thus, using conventional methods, the triangle 24 may be referenced variously to the eyepoint O in terms of three-dimensional coordinates; see the referenced book, *Principles of Interactive Computer Graphics,* at page 339. Also, a discussion of world space and related transforms appears in Chapter 8 of the book, *Fundamentals of Interactive Computer Graphics,* by Foley and Van Dam, published in 1984 by Addison-Wesley Publishing Company. Also, see a section of the book, *Interactive Computer Graphics,* by Wolfgang K. Giloi, published in 1978 by Prentice-Hall, Inc., beginning at page 84 and treating space or domain transformations.

Generally, as explained above, to view the triangle 24 (exemplifying a single portion of an object) from the eyepoint O, areas of the triangle are defined in screen space at the plane of the screen 28, see the above-referenced book, *Principles of Interactive Computer Graphics,* at page 341.

In accordance with convention, the screen 28 comprises the base of a pyramidal view frustum 30 with an apex 32 at the eyepoint O. In a sense, the viewing screen 28 (at the base of the frustum 30) may be analogized to the screen of a television display through which world-space objects (as the triangle 24) are viewed.

In accordance with traditional practice, the space of the screen 28 is dissected into small picture elements or pixels. For example, one million pixels may be organized in an array of one thousand rows, each of one thousand pixels. Representative pixels 34 and 35 (idealized and enlarged grossly out of scale) are illustrated in relation to the screen 28. Note that a ray 36 extends from the eyepoint O passing through the center of the pixel 34 to a point PP on the triangle 24. Somewhat similarly, a ray 37 extends from the eyepoint O, passing through the center of the pixel 35 to a point PL on the line 23.

The rays 36 and 37 exemplify perhaps a million of such rays that dissect the screen 28 to compose a picture or display image. Each ray passes through a pixel, e.g. pixels 34 and 35, then continues beyond the screen 28 and may intersect one or more primitives, e.g. polygons or lines, in world space that provide the color and intensity for each pixel. Pictures are composed by scan converting the pixels as in a raster pattern and subsequently displaying them in a similar pattern.

Figure 3:
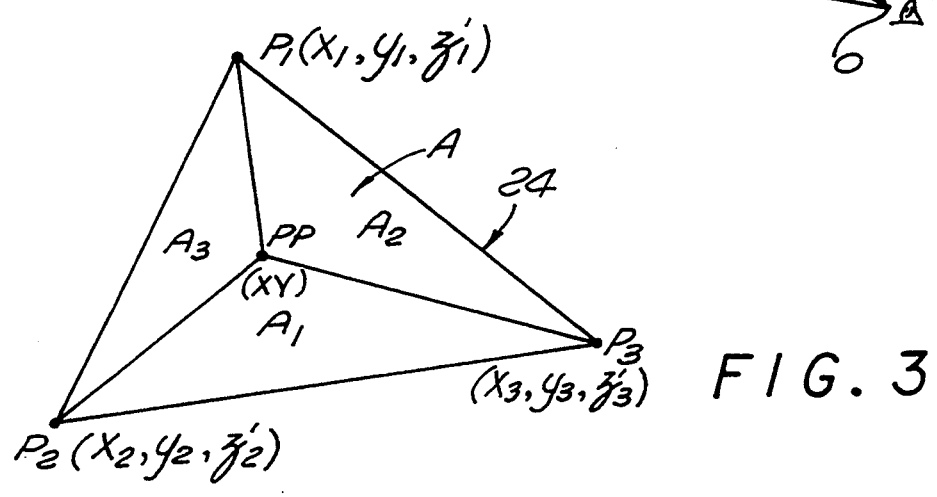
FIG. 3 is a graphic representation illustrating barycentric coordinates with respect to a triangle as developed herein.

At this point, the triangle 24 will be considered with regard to interpolation as related to FIG. 3. In that regard, assume that the points $P_1$, $P_2$, and $P_3$ (FIG. 3) are defined with the dimensions x and y in screen space while the dimension z is in non-distorted eye space. Accordingly, the points are specified as the terms: $P_1(x_1,y_1,z'_1)$; $P_2(x_2,y_2,z'_2)$; and $P_3(x_3,y_3,z'_3)$. Note that the z-dimension terms are transformed to space not subject to non-linear distortion for interpolation. Also, in accordance with the present invention, lines may be interpolated in non-distorted space. Thus, it is to be appreciated that in a system that interpolates triangles, in accordance herewith, the capability to interpolate lines can be added very economically.

As indicated above with reference to FIG. 2, the point PP lies in the plane of the triangle 24. It is to be recognized as will now be considered with reference to FIG. 3 (enlarged), that the point PP may be defined in terms of the points $P_1$, $P_2$, and $P_3$ using the equation: $PP = b_1P_1 + b_2P_2 + b_3P_3$, where $b_1$, $b_2$, and $b_3$ are called the barycentric coordinates of the point PP. Thus, the point PP is defined by a unique set of barycentric coordinates; and as a further consideration, the coordinates $b_1 + b_2 + b_3 = 1$. Accordingly, by applying the barycentric coordinates, the point PP can be calculated as a linear combination of the points $P_1$, $P_2$, and $P_3$ as well known in the prior art. For example, if $b_1=1$, $b_2=0$, and $b_3=0$, the defined point lies at the vertex $P_1$. As another simple example, if: $b_1=\frac{1}{3}$, $b_2=\frac{1}{3}$, and $b_3=\frac{1}{3}$, the point PP lies in the center of the triangle 24.

In view of these comments, and as well known in the prior art, barycentric coordinates can be utilized to interpolate triangles. In that regard, techniques are well known for computing and utilizing barycentric coordinates to accomplish interpolation. For example, barycentric coordinates in screen space may be expressed in terms of the areas $A_1$, $A_2$, and $A_3$ as illustrated in FIG. 3. Specifically:

$b_1 = A_1/(A_1+A_2+A_3)$
$b_2 = A_2/(A_1+A_2+A_3)$
$b_3 = A_3/(A_1+A_2+A_3)$

Once the barycentric coordinates $b_1$, $b_2$, and $b_3$ are calculated along with variations as treated in greater detail below, they may be used for interpolation and, accordingly, for smooth shading. For example, shading can be accomplished using three components of the surface normal vectors that are interpolated for each pixel in accordance with the Phong shading techniques. Note that the related operations involve the transformation of $b_1$, $b_2$, and $b_3$ to $b'_1$, $b'_2$, and $b'_3$ in eye space. In that regard, reference will now be made to FIG. 3.

In the triangle and a pixel P as shown in FIG. 3, the pixel P and the vertices $P_1$, $P_2$, and $P_3$ may be used to form three triangles $PP_1P_3$, $PP_3P_2$ and $PP_2P_1$ as illustrated above. The areas of the three triangles are easily calculated using cross-products as disclosed in the referenced U.S. patent application 07/758,992.

Note that the cross-products are calculated in the x,y plane and require only a simple amount of computation.

Treating the areas $A_1$, $A_2$ and $A_3$ as three distinct triangles as illustrated in FIG. 3, it may be seen that the following equations are applicable based on traditional equations for determining the area of triangles:

$A_2 = \frac{1}{2}[PP_1 \times PP_3] = \frac{1}{2}[(y_3-y)(x_1-x) - (y_1-y)(x_3-x)] = \frac{1}{2}c_2$
$A_3 = \frac{1}{2}[PP_2 \times PP_1] = \frac{1}{2}[(y_1-y)(x_2-x) - (y_2-y)(x_1-x)] = \frac{1}{2}c_3$
$A_1 = \frac{1}{2}[PP_3 \times PP_2] = \frac{1}{2}[(y_2-y)(x_3-x) - (y_3-y)(x_2-x)] = \frac{1}{2}c_1$ Furthermore, for calculation of the barycentric coordinates of the triangle 24 in eye space, one method involves definitions of the points $P_1$, $P_2$ and $P_3$ by the x, y and z' coordinates where the x and y coordinates are defined in screen space and the z' coordinate is defined in eye space. Thus, the points are defined as follows:

$P_1$ is defined by $x_1$, $y_1$ and $z'_1$
$P_2$ is defined by $x_2$, $y_2$ and $z'_2$
$P_3$ is defined by $x_3$, $y_3$ and $z'_3$ As disclosed in the referenced U.S. patent application 07/758,992, the calculation of $b'_2 = 1 - b'_1 - b'_3$, distills to a remarkably simple set of equations:

$$b'_1 = \frac{c_1 z'_3 z'_2}{c_1 z'_3 z'_2 + c_3 z'_1 z'_2 + c_2 z'_1 z'_3}$$

$$b'_3 = \frac{c_3 z'_1 z'_2}{c_1 z'_3 z'_2 + c_3 z'_1 z'_2 + c_2 z'_1 z'_3}$$

$$b'_2 = \frac{c_2 z'_1 z'_3}{c_1 z'_3 z'_2 + c_3 z'_1 z'_2 + c_2 z'_1 z'_3}$$

To summarize, interpolation occurs in screen space with the barycentric coordinate transformation back to eye space. Accordingly, the barycentric coordinates $b'_1$, $b'_2$, and $b'_3$ are in eye space. Once these barycentric coordinates are known, they may be used to interpolate lines as well as triangles as disclosed in detail below. However, consideration of pixel processing techniques is now timely.

At this point, some consideration will be given to FIG. 4 in relation to pixel sampling as related to a polygon edge or line. Specifically, the line 23 is represented with adjacent areas of influence as defined by lines 42 and 44. For example, pixel sampling points that lie in the areas 46 and 48 (bounded by the lines 42 and 44) are to be reflected by the display of the line 23. That is, any pixel sample point lying within the areas 46 or 48 is to receive a contribution from the line 23. Such operation is in accordance with recognized criteria for providing well defined anti-aliased images. For example, a specific disclosure of techniques for effectively providing computer graphics lines is disclosed in U.S. Pat. No. 4,873,515 entitled "Computer Graphics Pixel Processing System" by Dickson and Rushforth.

Essentially, an effective technique involves intensifying pixel-contribution illumination to a line as the pixel moves into alignment with the line. For example, if a sample point for a pixel lies directly on a line, the pixel would be fully illuminated to the line intensity. However, as the sample point or center for the pixel moves away from the line, it progressively receives less illumination contribution from the line in accordance with a Gaussian distribution. The effect of such operation is to provide lines that appear in a display to be sharper and smoother.

With respect to FIG. 4, a pixel sample point 50 is centered in a circle 52 representing the area of a pixel. Similarly, on the other side of the line 23, a point 54 is centered in a circle 56 representing a pixel. With regard to the present invention, it is important to appreciate that as the pixel sampling points 50 and 54 move closer to the line 23, the influence of the line will change both in representing the line and in representing shading for the line. Accordingly, as disclosed in detail below, pixel sampling points are interpolated to attain desired pixel contributions from the line 23.

Referring now to FIG. 5, a pixel sampling point 60 is illustrated lying above the line 23. Essentially, in accordance with the present invention, the line 23 is interpolated, e.g. shaded, by constructing a triangular polygon with the line 23 as one edge. The line 23 is then interpolated on the basis of the triangle as by the use of barycentric coordinates. That is, by utilizing barycentric coordinates, a constructed triangle is interpolated with respect to an edge constituting the line 23.

In relation to the present invention, an interpolating triangle may be variously constructed; however, one simple method may be described graphically. Move perpendicular from the midpoint of the line 23 (FIG. 5) to a point $P_0$ a distance of one-half the line length in screen space. Specifically, from a point 62, midway between the points $P_1$ and $P_2$, a line 64 is extended perpendicularly for a distance one-half the length of the line 23. The factor of one-half is somewhat arbitrary; however, it does produce an isosceles triangle with a desirable aspect ratio. Note that neither the midpoint location of the point 62 nor the length of the line 64 is limited to the disclosed example. Note that the triangle of FIG. 5 is designated $P_0P_1P_2$ while the triangle 24 of FIG. 3 is designated $P_1P_2P_3$. Of course, the mathematics herein treating triangles transcends such designations.

The termination of the line 64 at the point $P_0$ forms a vertex of a triangle 65 further defined by the endpoints $P_1$ and $P_2$ of the line 23. The point $P_0$ may be specified in terms of the coordinates for the points $P_1$ and $P_2$. For example, $$x_0 = \left(\frac{x_1 + x_2}{2}\right) \pm \left(\frac{y_1 - y_2}{2}\right)$$

$$y_0 = \left(\frac{y_1 + y_2}{2}\right) \mp \left(\frac{x_1 - x_2}{2}\right)$$

Incidentally, as mentioned above, though the operations for lines may occur in screen space, it may be desirable to develop $z'_0$ in eye space. That is, even though the line is defined in screen space, $z'_0$ may be used and, therefore, should be calculated. Specifically, the quantity $z'$ may be used to transform barycentric coordinates back to eye space. Accordingly: $z'_0 = (z'_1 + z'_2)/2$.

With the triangular polygon $P_0$, $P_1$, $P_2$ developed as illustrated in FIG. 5, barycentric coordinates may be employed to interpolate and, accordingly, shade the line 23. As an example, consider a pixel sample at the point 60 as impacted by the line 23.

By drawing lines from the pixel point 60 to each of the points $P_0$, $P_1$, and $P_2$, areas $A_0$, $A_1$, and $A_2$ are defined. As indicated above, barycentric coordinates and their use to interpolate a triangular polygon are well known in the prior art. Specifically, barycentric coordinates are treated in a paper entitled, "Representation and Approximation of Surfaces" by Robert E. Barnhill, appearing in *Mathematical Software III*, published in 1977 by Academic Press, Inc.

Returning to a consideration of FIG. 5, pixel sample points 60 and 70 are illustrated lying off the line 23, however, within the circles 63 and 72 of influence for the line 23. Note that, basically, for shading a line, $A_0$ is coerced to zero independent of which side of the line the pixel falls on. In accordance with one processing technique, the area $A_0$ is reduced to zero which has the effect of coercing the points 60 and 70 to the line 23 as illustrated by arrows 61 and 71. The sample points 60 and 70 then are processed by interpolation as described above. Generally, the technique is quite effective for triangles approaching an equilateral aspect.

The technique described above accomplishes shading of lines. This same technique may be applied to shade the edges of triangles as if these edges were lines. Specifically, with regard to FIG. 8, triangle 200 (points $P_1$, $P_2$ and $P_3$) is represented along with isosceles triangles 202, 204 and 206, which are constructed from the screen space x,y coordinates of edges $P_1P_2$, $P_2P_3$ and $P_3P_1$, respectively. Then the triangle 200 may be shaded as follows. If $A_1$, $A_2$ and $A_3$ are all greater than zero (>0), the point PP falls inside the triangle, and shading is accomplished using $b'_1$, $b'_2$ and $b'_3$ calculated from $A_1$, $A_2$ and $A_3$. If area $A_1$ is less than zero ($A_1<0$), then point PP falls outside edge $P_2P_1$ and hence isosceles triangle 204 is used to accomplish shading of the edge. If the area $A_2$ is less than zero ($A_2<0$), then point PP falls outside edge $P_3P_1$ and hence isosceles triangle 206 is used to shade the edge. If the area $A_3$ is less than zero ($A_3<0$), then point PP falls outside edge $P_1P_2$ and isosceles triangle 202 is used to shade the edge. Thus, the signs of areas $A_1$, $A_2$ and $A_3$ determine which of the triangles 200, 202, 204 and 206 is used to accomplish shading.

Figure 6:
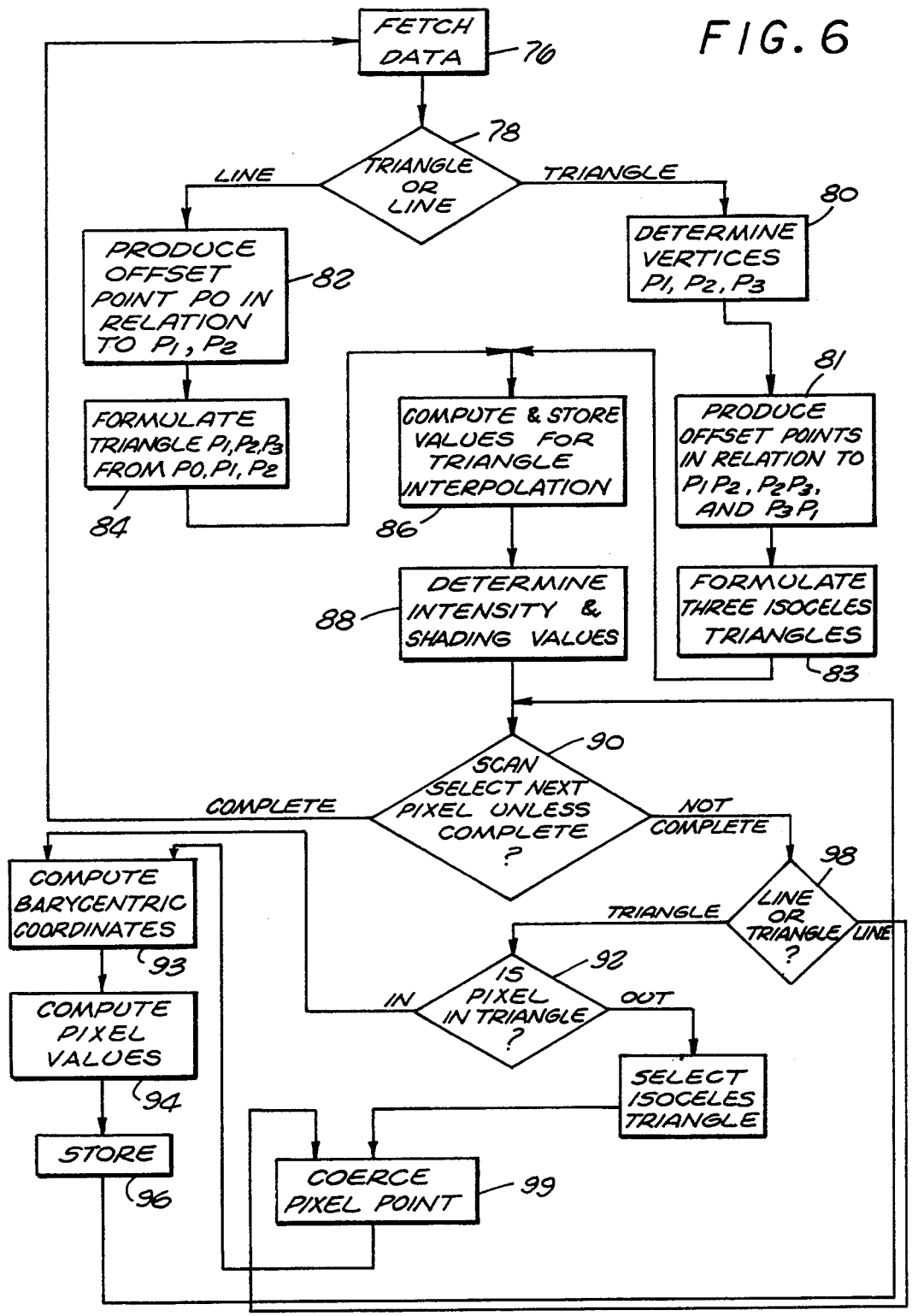
FIG. 6 is a flow diagram illustrating an exemplary process for implementation in accordance with the present invention.

Relating the above descriptions to the creation of pictures or images, certain basic considerations are to be stressed. Specifically, it is to be understood that the system of the present invention has application to the creation of images from primitives in the form of lines and to shading or otherwise interpolating such lines or polygon edges (FIGS. 5 and 8). That is, the system involves the interpolation of lines and/or edges for display which may involve either shading or texturing. In that regard, a triangle is constructed for a line and used to shade that line. Of course, interpolated values are utilized in processing pixels for the display and, accordingly, data is stored for compilation as a composite image. In that regard, the process of converting a viewing area to a pixel array is generally termed "scan conversion" and is well known in the prior art. To consider operations specific to the process of the present invention, reference will now be made to the flow diagram of FIG. 6.

The first block 76 (FIG. 6, upper center) indicates "FETCH DATA" relating to triangles or lines (edges) specified in coordinates with respect to a defined viewpoint. Essentially, such primitives may be treated in sequence and, in that regard, are scan converted to develop pixel data representations. As indicated above, hidden surface priorities also may be involved, however, may be treated independently using well known techniques.

An initial test is indicated by the query block 78 for identifying lines (edges) versus triangles. That is, the processing path splits depending on whether the primitive is a triangle or a line. If a triangle is indicated, the process proceeds to a block 80 indicating the step of determining the triangle vertices for subsequent processing. Furthermore, the process includes steps of formulating three isosceles triangles as described with reference to FIG. 8 and as indicated by blocks 81 and 83.

Contrary to the above possibility, if the primitive being treated is a line (block 78) the process proceeds from the block 78 to a block 82 indicating the construction of a triangle as described graphically and arithmetically above (FIG. 5). That is, a point $P_0$ is developed in relation to the points $P_1$ and $P_2$ as represented by a block 84 so as to construct a triangular edge for interpolation. The process is furthered in that the constructed triangle is treated as a polygon $P_1$, $P_2$, $P_3$ for interpolation similar to the primitives already in a triangular form $P_1$, $P_2$, $P_3$ (block 80).

From either of the blocks 83 and 84, the process proceeds to a block 86 representing the step of computing and storing values for polygon interpolation as explained above. Proceeding, from the block 86, the process moves to a step of block 88 representing the determination of the intensity and shading values for the interpolation as contemplated. Thus, the preliminary operations are accomplished for interpolating the line or triangle on the basis of sampling operations to obtain representative contributions for each pixel. Accordingly, the process proceeds with the scan conversion operation specifically as indicated by the query block 90. The query involves selecting the next pixel, if one exists, otherwise treating the process as complete.

If the process is complete at the state of block 90, as indicated in the diagram, it returns to block 76 to fetch data for a fresh triangle or line. Alternatively, if the process is not complete, the next pixel is initiated for processing in relation to the current primitive. Specifically in that regard, the query block 91 poses the question of whether a line or a triangle is being processed. Consider first the case where a triangle is processed.

If the sampling location for the current pixel is within a triangle, the process proceeds to a step indicated by a block 93 (left), specifically, computing the barycentric coordinates as indicated above. With such a computation, the sampling is accomplished in that the pixel values are computed as indicated by the block 94 after which the values are stored as indicated by the block 96. Thereafter, the process returns to the block 90, and if another pixel remains, it is treated.

Returning to the query block 92, if the pixel is not in the triangle (actual or constructed), the process proceeds to a block 98 for the selection of an isosceles triangle as explained above with reference to FIG. 8, after which the pixel point is coerced to lie on the triangle edge (block 99). With external sampling points coerced, the process proceeds from the block 99 to the blocks 93, 94, and 96 to complete the process and initiate the next cycle of operation.

Consider now the case where a line is processed. In this case the isosceles triangle constructed for the line (FIG. 5) is used to coerce the pixel point (block 99) and the process passes to blocks 93, 94 and 96.

Figure 7:
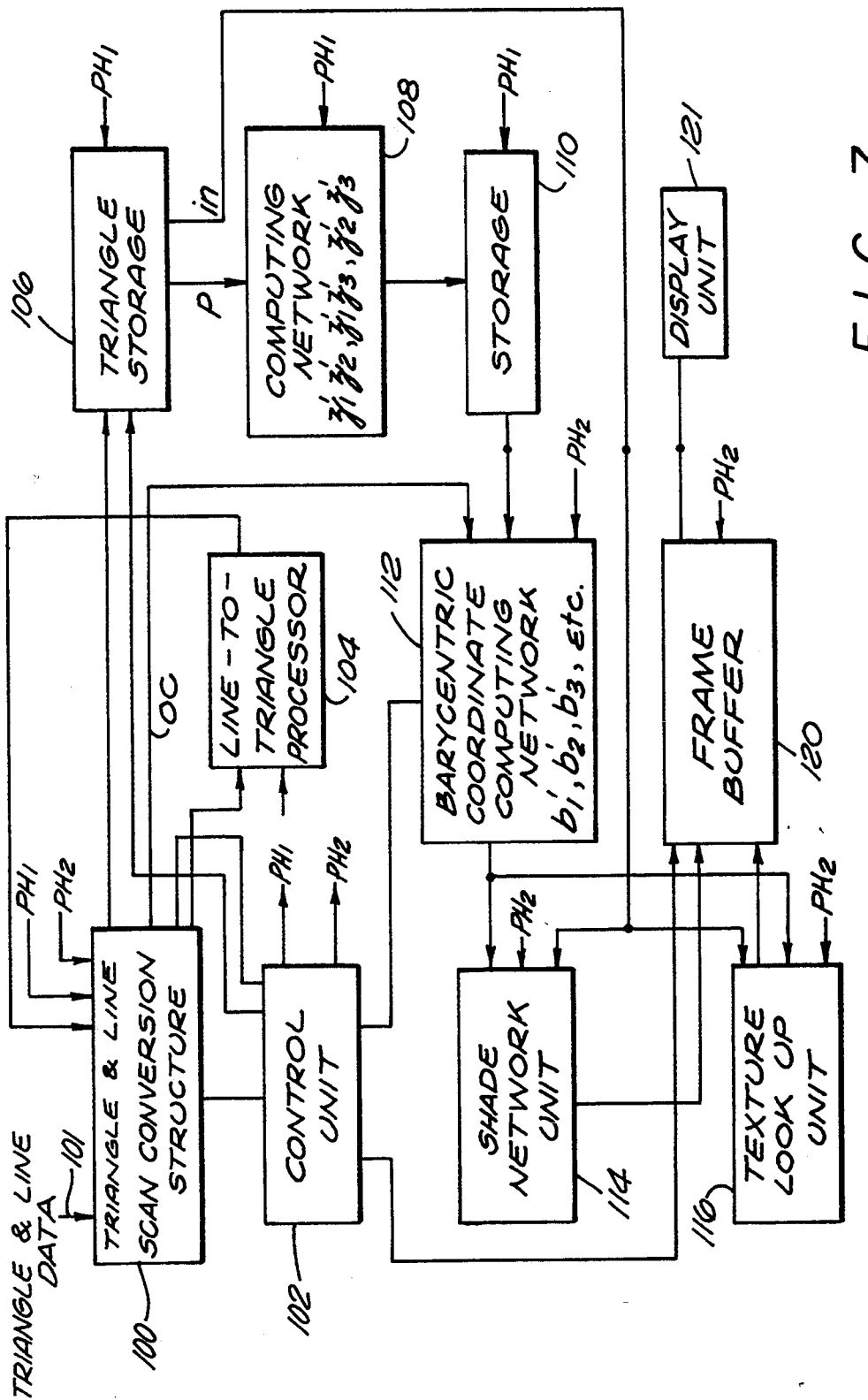
FIG. 7 is a block diagram of a computing structure in accordance with the present invention.

A structure in accordance herewith for computer graphics processing is illustrated in FIG. 7, specifically with regard to interpolating lines and/or edges along with triangles as to accomplish shading or texture mapping. As the processes of the computing operations were described in detail above, the following explanation primarily relates to structure implementing the illustrative process.

Referring to FIG. 7, a scan conversion structure 100 (upper left) receives digital representations of triangles and lines (edges). That is, the structure 100 receives triangle and line data as indicated through a bus 101, for example, from transformation hardware in a well known display processor (not shown). Essentially, in accordance with the prior art, primitive data (representing lines and triangles) is transformed preparatory for further processing as by shading and texturing as will now be disclosed in detail.

The component system as illustrated in FIG. 7 operates in two phases designated $PH_1$ and $PH_2$. Signals definitive of the two phases $PH_1$ and $PH_2$ are provided by a control unit 102 (left). It is to be appreciated that the control unit 102, along with the scan conversion structure 100, typically would be incorporated in a total computer graphics system of considerable complexity, basic forms of which are well known in the art. However, for purposes of explaining the present invention, the structure of FIG. 7 is illustrated with components somewhat segregated so as to afford a manageable disclosure explanation.

The binary control signals $PH_1$ and $PH_2$ from the control unit 102 (left) sequence the operation of the components as illustrated in the system of FIG. 7. Generally in that regard, the high state signal $PH_1$ (binary) defines an initial phase, also designated $PH_1$. While the first phase $PH_1$ involves some processing of line (edge) and triangle data, the second phase $PH_1$, defined by the high state signal $PH_2$ (binary), affords the computation of interpolation as to shade and/or texture, thus accomplishing values for each individual pixel as lines and triangles are scan converted.

The scan conversion structure 100 is coupled to several blocks representing operation components in the system. Specifically, a connection to a storage 106 (upper right) affords the storage of triangles for individual processing. The storage 106 also is coupled to a computing network 108 and receives the signal-represented polygon data P during the initial phase $PH_1$ and in turn supplies specific components of the data to other operating units including a storage 110 during the phases $PH_1$ and $PH_2$ (designated by the similarly named signals).

The scan conversion structure 100 (upper left) also is connected in a loop with a processor 104 (upper center) for converting lines to triangles or defining polygon edges. The processor 104 may simply formulate coordinates for a perpendicularly offset point as explained in detail above (FIGS. 5 and 8) to provide the third vertex of a triangle along with the ends of a line. Alternatively, three triangles may be constructed for the edges of a triangle as explained with reference to FIG. 8. Accordingly, data representative of lines or triangles is passed from the scan conversion structure 100 through the processor 104 to accomplish data for triangles that are returned to the structure 100 for subsequent processing as a triangle to interpolate an edge as described in detail above.

The scan conversion structure 100 (upper left) also is connected to a barycentric network 112 along with the interconnected control unit 102. During the second phase $PH_2$, the scan conversion structure 100 supplies signal-represented values for each individual pixel to the computing network 112 (FIG. 7, center). The computing network 112 may take various structural forms utilizing structures and techniques of the prior art to compute values for the barycentric coordinates $b'_1$, $b'_2$, $b'_3$ for implementing the interpolative operations as described in considerable detail in the referenced patent application.

The barycentric coordinates $b'$ are provided to a shade network 114 and a texture unit 116. Additionally, the polygon storage unit 106 (upper right) provides intensity signals $i_1$, $i_2$, and $i_3$ ($i_n$) to the shade network unit 114 and $u_1$, $v_1$, $u_2$, $v_2$, $u_3$ and $v_3$ to the texture unit 116. From the shade network 114 and the texture unit 116, individual pixel data is accumulated in the frame buffer 120 for display by the display unit 121.

Considering the detailed operation of the system of FIG. 7, the signal-represented line and triangle data is received in the structure 100 for specific analysis and distribution. Data indicative of lines is cycled through the processor 104 to accomplish a third vertex as described above and thereby define a triangle. Accordingly, as explained in detail above, the lines may be processed as the edge of a triangle.

The structure 100 is actuated by the control unit 102 which sequences the distinct phases $PH_1$ and $PH_2$ and thereby controls the operations to move and develop signals representative of specific data as suggested above. Thus, triangles are processed either at an interior point or at edges, and lines may be processed as well.

During the phase $PH_1$, the preliminary data for polygons and lines is received by the scan conversion structure 100 for preliminary processing as indicated above. Subsequently, during the phase $PH_1$, the data in the scan conversion structure 100 is reduced to a polygon and stored in the polygon storage 106. Still later in the phase $PH_1$, the polygon storage 106 transmits signal representations for the polygon vertex points $P_1$, $P_2$, and $P_3$ to the computing network 108 which calculates the values for interpolation, specifically: $z'_1z'_2$, $z'_1z'_3$, $z'_2z'_3$ and so on. Representative signals for the computed values are transmitted from the network 108 to the storage 110 for use in computing the barycentric coordinates.

During the phase $PH_2$, the polygon scan conversion structure 100 (upper left) determines which pixels lie within a polygon currently in process, utilizing scan conversion operations to provide the screen-space x,y coordinates for each such pixel and to determine shading and texturing contributions from the current polygon. That is, as each pixel lying within the polygon is encountered, unique x and y values are transmitted to the computing network 112. Thereafter, the units 114 and 116 are actuated, utilizing the barycentric coordinate computations from the network 112 to determine shade and/or texture pixel data.

During the processing for each pixel, the barycentric coordinates $b'_1$, $b'_2$, and $b'_3$ are computed for the pixel and applied to the units 114 and 116. The unit 114 accomplishes the appropriate interpolation to provide shade value for the pixel by computing the representative values for solution of the equation $i_n = b'_1 i_1 + b'_2 i_2 + b'_3 i_3$. The determined values of $i_a$ (one for each pixel) are registered in the frame buffer 120 during the interval $PH_2$ in accordance with the particular display format, as well known in the art, to drive the display unit 121. The texture signals from the unit 116 are similarly registered. The display unit 121 may comprise a raster scan structure as disclosed in Chapter 12 of *Fundamentals of Interactive Computer Graphics* by J. D. Foley and A. Van Dam, published by Addison-Wesley Publishing Company, 1984.

It is to be recognized that alternative specific processes are known for computing values of the barycentric coordinates $b'_1$, $b'_2$, and $b'_3$ for use in the shade network 114 and the texture unit 116. Of course, the implementation of such variations necessitates changes in the computing network 112 from the disclosed operations. Generally, the capability of the network 108 is similarly altered to execute digital computations for the values of $A_1$, $A_2$, and $A_3$ utilizing signal representations from the polygon storage 106 indicative of the quantities specified. However, in such various forms of computation, the operation continues in accordance herewith of converting lines to polygons as by selecting a third vertex to accomplish a triangular polygon with the line endpoints. Thus, effective line shading may be accomplished for a distinct improvement in computer graphic images.

It may be seen that the system of the present invention enables the determination of barycentric coordinates for polygons in order to accomplish such specific operations as line smooth shading and texture mapping. Accordingly, it will be appreciated that from the above explanation, the system hereof is susceptible to a large number of modifications and deviations within the basic conceptual network. Accordingly, the scope hereof is deemed to be as set forth in the claims below.

What is claimed is:

1. A system for interpolating primitive data defining lines to provide pixel data for a computer graphics display, as for shading such lines, said system comprising:
    means for selecting a select offset point displaced perpendicular from a selected line defined by primitive data, said offset point being specified by offset point representations;
    means for storing said primitive data defining said lines and said offset point representations to define triangles; and
    interpolation means for interpolating sample points along said selected line including an interpolation means for interpolating said triangles defined by said selected line and said offset point to provide pixel values for a display.

2. A system according to claim 1 wherein said means for selecting an offset point selects a point offset perpendicularly from said selected line midpoint a distance of one-half the length of said selected line.

3. A system according to claim 1 wherein said interpolation means comprises means for providing barycentric coordinates for said sample points and interpolating accordingly.

4. A system according to claim 1 further including scan conversion means for selecting primitive data to specify said selected line and further to select said sample points.

5. A system according to claim 4 wherein said scan conversion means coerces select sample points to lie on said selected line.

6. A system according to claim 1 further including a frame buffer to receive said pixel values for display.

7. A system according to claim 6 further including a display unit coupled to receive display data from said frame buffer.

8. A system according to claim 1 further including shading means for operation with said interpolation means to shade said selected line.

9. A process for interpolating a line with respect to sample points as to shade said line, wherein said line is represented as primitive data for a computer graphics display, said line being defined by first and second endpoints, said process comprising the steps of:

selecting an offset point displaced perpendicularly from said line represented by primitive data;

storing said primitive data specifying said line and said offset point to define a triangle; and interpolating said sample points along said line by interpolating said sample points with reference to said triangle to provide display data.

10. A process according to claim 9 wherein said step of interpolating said sample points is performed using barycentric coordinates for said triangle.

11. A process according to claim 9 wherein the step of selecting an offset point involves selecting a point offset perpendicularly from said selected line midpoint a distance of one-half the length of said selected line.

12. A process according to claim 9 wherein said step of interpolating said sample points includes coercing select of said sample points to lie on said line for interpolation.

13. A system for interpolating primitive data defining polygons to provide pixel data for a computer graphics display, as for shading edges of such polygons, said system comprising:

means for selecting a select offset point displaced perpendicular from one selected edge of a polygon defined by primitive data, said offset point being specified by offset point representations;

means for storing said primitive data defining said one selected edge and said offset point representations to define triangles; and interpolation means for interpolating sample points along said one selected edge including interpolation means for interpolating triangles defined by said one selected edge and said select offset point to provide pixel values for a display.

14. A system according to claim 13 wherein said means for selecting an offset point selects a point offset perpendicularly from said one selected edge midpoint a distance of one-half the length of said selected line.

* * * * *

UNITED STATES PATENT AND TRADEMARK OFFICE
CERTIFICATE OF CORRECTION

PATENT NO.  : 5,381,519
DATED       : January 10, 1995
INVENTOR(S) : Russell A. Brown, et al.

It is certified that error appears in the above-indentified patent and that said Letters Patent is hereby corrected as shown below:

Column 1, line 20, change "S" to --§--;

Column 2, line 33, add comma after quote;

Column 6, line 5, change all "¼" to --½--;

Column 6, line 6, change "¼" to --½--;

Column 6, line 7, change all "¼" to --½--;

Column 6, line 7, add "]" after "($x_1$-x)";

Column 6, line 8, change all "¼" to --½--;

Column 6, line 8, add "]" after "($x_2$-x)";

Column 8, line 27, change "$P_2P_1$" to --$P_2P_3$--;

Column 10, line 31, change "$PH_1$" to --$PH_2$--; and

Column 11, line 61, change "$i_a$" to --$i_n$--.

UNITED STATES PATENT AND TRADEMARK OFFICE
CERTIFICATE OF CORRECTION

PATENT NO. : 5,381,519
DATED : January 10, 1995
INVENTOR(S) : Russell A. Brown, et al.

It is certified that error appears in the above-indentified patent and that said Letters Patent is hereby corrected as shown below:

Column 11, line 61, change "$i_1$" to --$i_n$--.

Signed and Sealed this

Eighteenth Day of April, 1995

*Attest:*

BRUCE LEHMAN

*Attesting Officer*

*Commissioner of Patents and Trademarks*